US006456928B1

(12) United States Patent
Johnson (10) Patent No.: US 6,456,928 B1
(45) Date of Patent: Sep. 24, 2002

(54) PROGNOSTICS MONITOR FOR SYSTEMS THAT ARE SUBJECT TO FAILURE

(75) Inventor: Daniel P. Johnson, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 57 days.

(21) Appl. No.: 09/751,420

(22) Filed: Dec. 29, 2000

(51) Int. Cl.$^7$ .............................................. G06F 19/00
(52) U.S. Cl. ..................... 701/114; 701/111; 702/82; 714/48
(58) Field of Search ................................. 701/101, 102, 701/103, 111, 114; 702/81, 82; 703/7, 8, 13, 17; 714/1, 2, 25, 48

(56) References Cited

U.S. PATENT DOCUMENTS

| 5,099,436 A | * | 3/1992 | McCown et al. .............. 702/82 |
| 5,586,252 A | * | 12/1996 | Barnard et al. ................ 714/48 |
| 6,223,143 B1 | * | 4/2001 | Weinstock et al. ............. 703/17 |

OTHER PUBLICATIONS

"AGATE Propulsion Monitoring and Diagnostic System"; Honeywell Technology Center; presented in Jul. 1999.

* cited by examiner

Primary Examiner—Willis R. Wolfe (57) ABSTRACT

Methods and devices for detecting and predicting parameter deviations and isolating failure modes in systems that are subject to failure. In a preferred embodiment, methods are provided for use with engines, including aircraft, automobile, and industrial combustion engines. However, numerous other applications are contemplated. Such engines may be described as having monitor points having current parameter values, where the monitor points may correspond to single physical sensors or to virtual or inferred monitor points having parameter values derived from multiple sensors. Acceptable ranges, limits, and values for each of the monitor point parameters may be provided for use with the present invention. Parameters lying outside of the acceptable ranges may be said to be in deviation. Ambiguity groups, including one or more failure modes or physical causes of the parameter deviations may also be provided. Parameter deviations, after optional filtering, may generate deviation signals which may be followed by analysis of the ambiguity groups to isolate the failure mode or modes causing the deviation. Courses of engine operation ameliorating the failure mode may be suggested. Methods are also provided for projecting current trends into the future to predict deviations and isolate failure modes early, prior to actual occurrence. One preferred use for the methods is early detection and isolation of faults in aircraft engines, leading to corrective action including early preventative maintenance.

28 Claims, 4 Drawing Sheets

PROGNOSTICS MONITOR FOR SYSTEMS THAT ARE SUBJECT TO FAILURE

FIELD OF THE INVENTION

The present invention is related generally to monitoring systems, and more specifically, to devices and methods for monitoring system performance or parameters to detect and isolate present and future predicted failures.

BACKGROUND OF THE INVENTION

Numerous systems or components in use today are subject to physical failure. Many of these systems have a monitoring mechanism for monitor the operation of the system. The monitoring mechanisms often have one or more monitoring points. One illustrative system is a combustion engine. Inevitably, combustion engines fail. Some engine failures may be prevented through replacement of parts, standard service procedures, and/or major overhauls. Engine failures or component failures may cause more harm than necessary due to a lack of real time information about the nature of the component failure and the lack of a real time suggestion as to a course of action which could ameliorate the component failure. The prevention of engine failure may not be carried out due to the lack of knowledge of current engine parameters, lack of knowledge of trends in engine parameters, and lack of knowledge of current component failures.

In combustion engines used in automobiles, unexpected or puzzling engine failures are at best inconvenient, at worst presenting safety issues. Failure in combustion engines used in industrial applications may cause unplanned down time and loss of production. Combustion engines used in aircraft may cause major loss of life upon unexpected failure.

What would be desirable, therefore, are systems and methods for better detecting and isolating system or component failures. Systems and methods for predicting future system or component failures before they occur would also be advantageous.

SUMMARY OF THE INVENTION

The present invention includes methods and devices for detecting faults or failure modes in systems that are subject to failure. The present invention is described with reference to an engine, but numerous other applications are contemplated. An engine may have numerous monitor points, with each point having an actual parameter value, and the engine having numerous failure modes. The monitor points may be measurable values which can include, for example, continuous values such as engine oil pressure, or binary state values such as ON or OFF, HI ALARM or NOT HI ALARM.

The present invention may use a range of acceptable values for each monitor point parameter. Values outside of this range may generate a deviation result or signal. Some ranges are binary values, such as OFF, which have no acceptable values other than the desired binary value. Other ranges are continuous values, such as two endpoints for a range, or a midpoint together with a margin about the midpoint. Another range is a high or low limit for a value, with any value exceeding the limit being cause for a deviation condition. In some embodiments, exceeding different limits for the same measured quantity can result in different deviation outputs.

Numerous ambiguity groups may be created by a user to work with the present invention, or may be included with a product according to the present invention. The ambiguity groups can include a number of failure modes, or faults that can be a cause, or the cause, of out of range values or deviations emanating from the monitor point parameter values. One class of failure modes is mechanical failures, for example, a ruptured fuel line. In one embodiment, an ambiguity group includes one or more failure modes, the monitor point parameter deviation that would result from the failure mode or combination of failure modes, and the probability of the combination of failure modes occurring together to produce the deviation signal. The ambiguity groups can be clustered together about common deviation signals than can be caused by the failure modes. In one example, all ambiguity groups that could result in lower than expected RPM could be grouped together in vectors or collections of ambiguity groups. In one embodiment, the ambiguity groups are collected together in a table.

In operation, the engine failure detector can collect data from sensor values, and operate upon the sensor values to form parameter values for monitor points. Some monitor points are directly coupled to sensors while other monitor points are synthesized from multiple sensor values to form virtual or inferred monitor points.

The parameter value may be obtained, and compared with the desired parameter value range by a monitor point comparator function. If the comparator function decides that the actual parameter value exceeds the acceptable range, a deviation signal may be generated. In some embodiments, a presumptive deviation signal is filtered prior to outputting the deviation signal. The filtering is often used to reduce the number of false alarms.

Once a deviation signal is generated, a fault isolator functionality can operate on the provided deviation signal or signals. In one embodiment, all the ambiguity groups having a particular deviation signal are collected together. Given the collected ambiguity groups, one or more of the ambiguity groups can be selected as the most likely ambiguity groups to have generated the deviation signal. In one embodiment, the ambiguity group having the highest probability is selected. In another embodiment, the possible ambiguity groups are analyzed to determine intersecting failure modes, if any. It is contemplated that the ambiguity groups may be Boolean ANDed together to determine common failure modes.

The failure mode or modes selected as most likely to have caused the deviation signal may be output to a human operator, and may be fed to an automatic control function which may determine a course of action to alert or ameliorate the condition caused by the failure mode.

Some embodiments of the invention have failure predictors as well. A history of values for monitor point parameters may be collected by a data historian functionality. Some embodiments record the data in a sliding window. The historical data can be extrapolated or projected out into the future, and a prediction made as to whether the projected monitor point parameter value trends will exceed the range of acceptable values for that monitor point parameter. If a deviation condition is predicted, a projected deviation signal and the projected time for that deviation may be output for use by a human operator and/or fed back to an engine control system to ameliorate or even postpone the predicted deviation signal condition. In many embodiments, the predicted deviation signal is analyzed to isolate a fault in a manner similar to the fault isolation performed for a present deviation signal. In some embodiments, the early deviation signal predicted is used to suggest preventative maintenance earlier than otherwise planned.

DETAILED DESCRIPTION OF THE INVENTION

Figure 1:
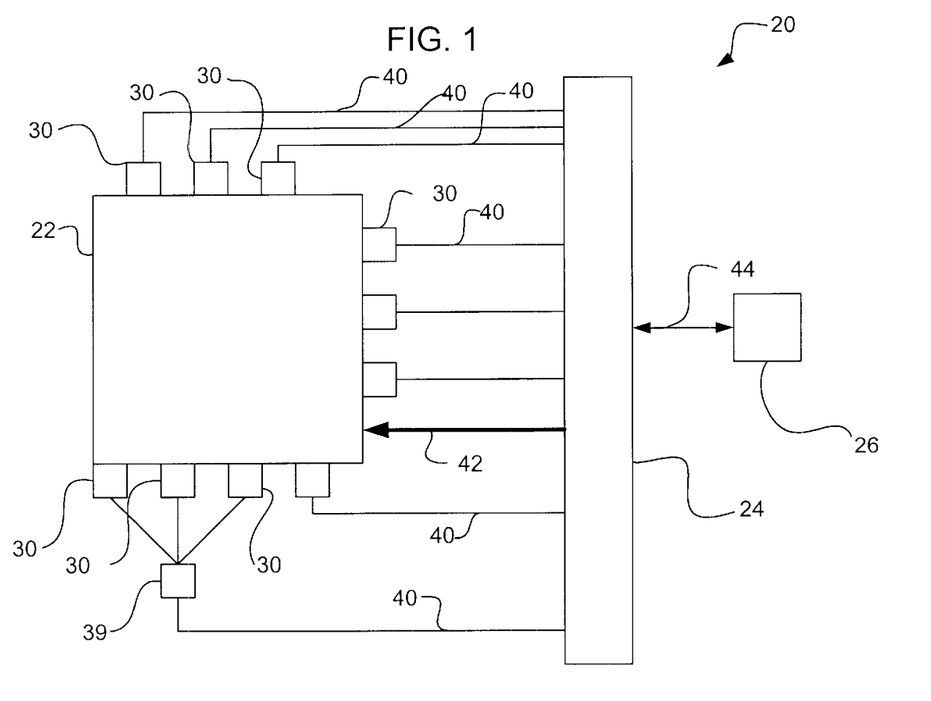
FIG. 1 is a schematic diagram of a combustion engine and engine monitoring system.

FIG. 1 illustrates an engine fault monitoring system 20 coupled to a combustion engine 22 and having a computer 24. Combustion engine 22 can be any combustion engine, including automobile engines and aircraft engines. In a preferred embodiment, engine 22 is an aircraft engine. Computer 24 can be any suitable computing device, including general purpose computers and dedicated single purpose computing devices, which can include single board, microprocessor based devices.

Engine 22 may be seen to have a number monitor points 30, coupled to computer 24 through a number of data communication lines or channels 40. Monitor points 30, are associated with parameters, often the direct or filtered output of physical sensors. Examples of sensors include oil pressure sensors and oil temperature sensors. Examples of corresponding monitor points can be oil pressure and oil temperature. For purposes of understanding the present invention, monitor points may be considered to be associated with physical entities, concepts, values, or states, while monitor point parameters may be considered to be the data associated with the monitor point.

Examples of some corresponding monitor point parameters can be hi-oil pressure, hi-hi oil pressure, low oil pressure, low-low oil pressure, hi-oil temperature, hi-hi-oil temperature, low oil temperature, low-low oil temperature. Parameters may be selected from the group consisting of: air filter pressure switch; air throttle valve position; alternator inoperative sensor; alternator output voltage; backup control select; battery level; cylinder head temperature (CHD); exhaust gas oxygen (EGO); exhaust gas temperature (EGT); engine crankshaft position; fuel filter pressure switch; fuel flow transducer; fuel injector pulse width command; fuel inlet pressure; fuel pressure; fuel pump outlet pressure; fuel to air ratio; fuel to air ratio trim; ignition and timing command; knock sensor; manifold air pressure (MAP); manifold air temperature (MAT); oil chip detector; oil cooler delta pressure switch; oil filter delta pressure; oil fuel content; oil pressure; oil quantity; oil temperature; revolutions per minute (RPM); sparkplug energy pulse; turbine inlet temperature; turbocharger compressor discharge pressure; turbocharger compressor seal delta pressure; vibration; and wastegate valve position, and combinations thereof.

Monitor points may be virtual, synthesized, or inferred monitor points, where the monitor point is created using information from more than one sensor. One example of a virtual monitor point would lower the expected RPM, given the fuel and air flow going to the engine. Engine efficiency would be another example of a virtual monitor point. A virtual monitor point 39 is illustrated in FIG. 1, using a series of monitor points 30 as inputs.

Computer 24, executing a computer program, can analyze the data provided by the monitor point parameters, trend the monitor point parameters historically, and store the acceptable deviation ranges for the points. The appropriate data can be output through data communication line or channel 44 to a computer output or input/output device 26. In many embodiments, computer output device 26 is optimized for human input and output. In one example, deviation signals or alarms and suggested courses of action are output to device 26. In some embodiments, device 26 accepts human operator inputs to modify the operation of engine 22. In some embodiments, either computer or human generated changes in engine operation are fed back to engine 22 through a command interface line or channel 42.

Figure 2:
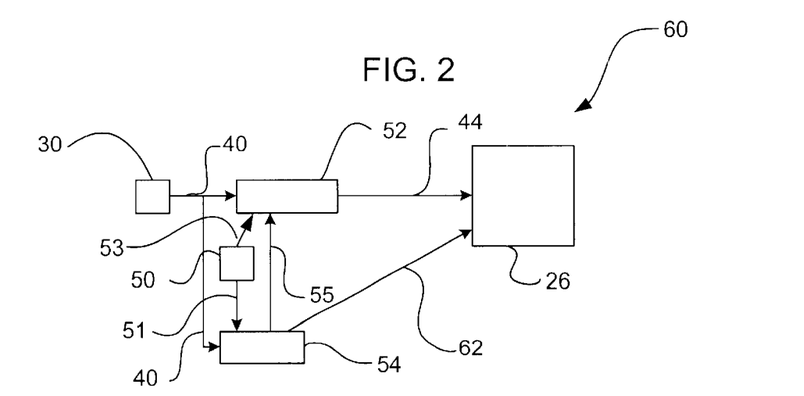
FIG. 2 is a simplified data flow diagram of a fault isolating method according to the present invention.

FIG. 2 illustrates a simplified data flow diagram 60 of the data flow which can occur in computer 24 or other comparable controller. Data flow diagram 60 includes a comparator functionality or comparator 52 and a data historian/predictor functionality 54. An acceptable deviation range 50 is also present, coupled to historian/predictor 54 through data line or channel 51 and to comparator 52 through data line or channel 53. The result of historian/predictor 54 is coupled to comparator 52 through data communication line or channel 55. The result of historian/predictor 54 can also be coupled to output or input/output device 26 through a data communication line or channel 62.

Data historian/predictor 54 can trend data for the monitor points over time, where the sample interval can vary and be appropriate to the time constant or period for the point being monitored. In one embodiment, the historical data is stored in a sliding window or circular file, for a fixed period of time, before being overwritten with new data. The historical data may also be filtered prior to being stored and may also be compressed.

The historian/predictor 54 preferably has an extrapolation or projection functionality, which takes the historical data and extrapolates or projects the historical trend out into the future. Using the acceptable deviation range provided by range 50, and the projection provided to comparator 52 by predictor 54 through data line 55, the comparator can determine whether any of the projected points will fall outside of the acceptable ranges. If the projected data falls outside of the acceptable ranges, the comparator can output a predicted deviation signal through output line 44 to device 26. In a preferred embodiment, the projected time of first deviation is also output from comparator 52 to device 26. In some embodiments, the historical data leading to the predicted deviation is also output to device 26 through data line or channel 62. The observation of the historical trend leading to the conclusion may be useful in some applications to allow for a human analysis which may indicate that the prediction is questionable. In some embodiments, the historical data preceding a predicted deviation is copied to another location and stored, or marked as data to not be written over, in order to preserve the data for future analysis.

The projection made by historian/predictor 54 is a straight line extrapolation of a least squares fit data in some embodiments. In other embodiments, a more sophisticated extrapolation method is used. One method utilizes a weighted least squares form of estimator, with the degree of the polynomial dependent upon the parameter being tested. Once the predicted deviation is output, further analysis may be performed in some embodiments of the invention.

Figure 3:
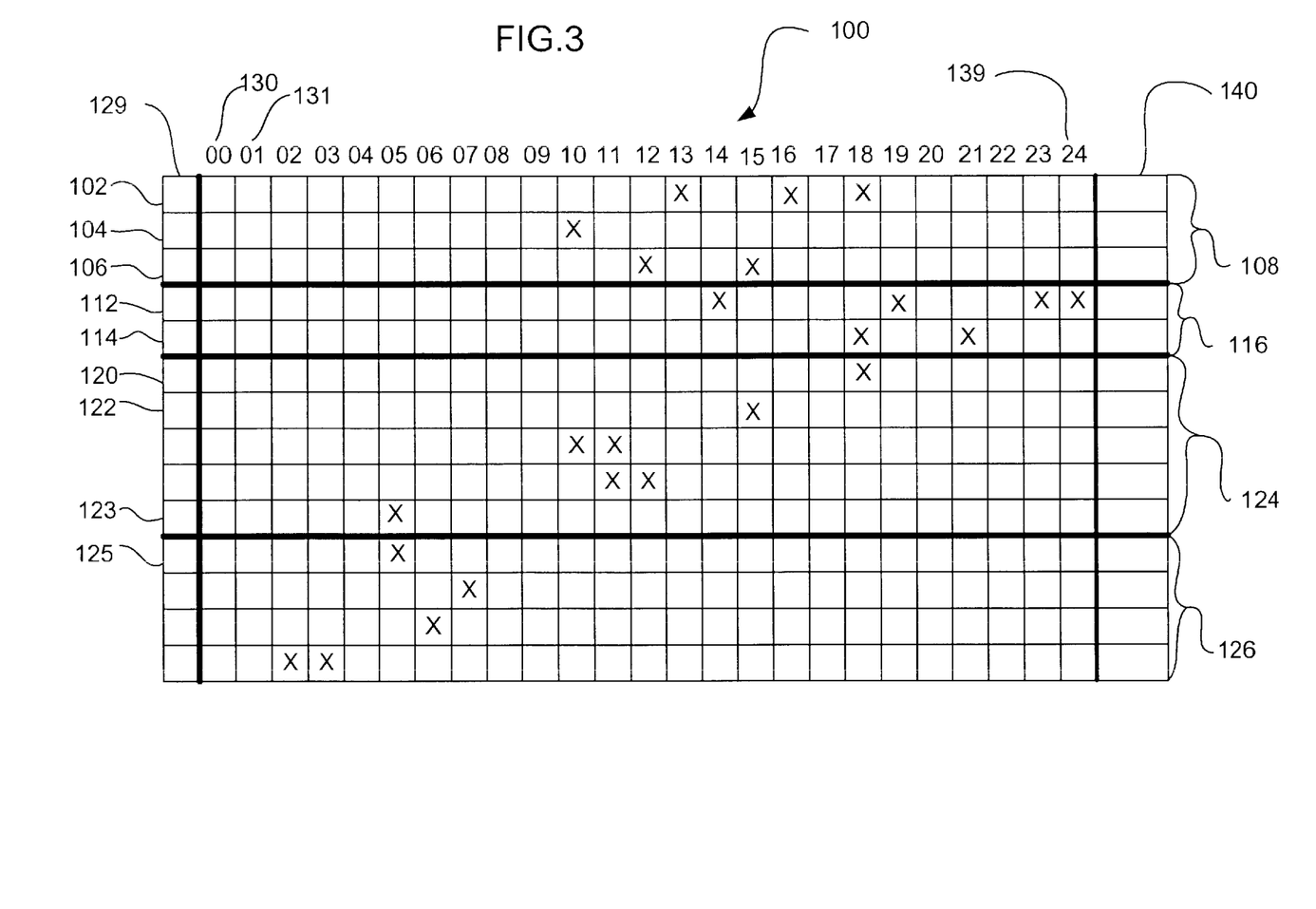
FIG. 3 is a schematic diagram of a table of ambiguity groups.

FIG. 3 illustrates ambiguity groups which are themselves grouped into groups within a table 100. Table 100 is presented for purposes of illustration, as the actual implementation of the invention may take many forms. Table 100 is a sparsely populated table having rows and columns, with the rows containing ambiguity groups such as ambiguity groups 102, 104, 106, 112, 114, 120, 122, 123 and 125. The columns in an example ambiguity group include a probability column or element 129, and a series of failure mode columns 130, 131, through 139. Failure mode columns are numbered 00 through 24, and may be referred to by column number for convenience and clarity below.

Table 100 also includes a deviation signal column or element 140, which contains a particular deviation signal, including the types of deviation signals previously discussed. For purposes of illustration, ambiguity groups in Table 100 are collected into groups having the same deviation signal. For example, ambiguity groups 102, 104 and 106 are grouped together into ambiguity group collections 108, where collections 108 have the same value in deviation signal column 140. Ambiguity group collections 116, 124, and 126 are also shown. In one example, deviation signal column 140 may contain the deviation signal for hi-oil pressure for all of the ambiguity groups within collection 108. Probability column 129 may contain the estimated probability of each of the ambiguity groups occurring.

An ambiguity group may thus consist of a series of failure modes that may result in the occurrence of a particular deviation signal. In the example in Table 100, failure modes 00 through 24 are shown. Each failure mode may correspond to a physical event or state that may lead to a deviation signal. In one example, a failure mode may be a ruptured fuel line while a deviation signal may be a lower than expected RPM and a loss of fuel pressure. Another example of a failure mode may be a blocked fuel filter, which may lead to deviation signals including high fuel pressure in one fuel line segment, low pressure in another segment, a high delta pressure across the fuel filter, and lower than expected RPM for a given throttle setting.

As can be seen in Table 100, some ambiguity groups have more than one failure node checked, indicating that more than one failure mode is required to result in the occurrence of the deviation signal for that ambiguity group. In one example, ambiguity group 102 requires failure modes 13, 16 and 18 to occur, while ambiguity group 104 only requires failure mode 10 to occur. The probability column 129 may contain an estimated probability for the ambiguity group. In one example, the occurrence of several failure modes together may be expected, and may be common, having a high probability. In another example, the occurrence of the multiple failure modes may be unlikely to occur at the same time, and the ambiguity group has a low probability. In yet another example, a single failure mode leading to a deviation signal may be estimated to be either highly probable or highly unlikely, and the value may be estimated by an engineer to populate the table.

Upon the occurrence of one or more deviation signals, the computer may indicate to the human operator the occurrence of the deviation signal, and may also attempt to provide an explanation of a possible cause or causes. In one example, a failure mode in column 05 in Table 100 may trigger a deviation signal corresponding to both ambiguity group 123 and 125. In some instances, the probability column may indicate that failure mode 05 is the likely cause, for either deviation signal standing alone. In other instances, the combination of both deviation signals may increase the probability that failure mode 05 is the cause or one cause of the deviation signal. In one embodiment, the probabilities of the ambiguity groups having an active deviation signal are combined. In one method, an intersection or Boolean AND operation is performed on all ambiguity groups having an active deviation signal. In some embodiments, failure modes are given negative weights or other indicia that they are required or strongly suggested to be NOT present in order for the particular ambiguity group to be the cause of a deviation signal.

In some modes of operation, it may occur that more than one failure mode may be the cause, and the failure modes may be unrelated, resulting in true ambiguity being conveyed to the human operator as the cause or causes of the deviation signal or signals. In some embodiments, where true ambiguity means that different failure modes could lead to identical deviation signals, the most serious failure mode may be selected and output. In some embodiments, in some situations, no single failure mode may readily be ascertainable, as for example, when an unexpected fault mode may be the cause. In this case, in some methods, the union of the ambiguity groups may be taken and the most serious of the failure modes selected for output. When a detection test indicates failure, each failure mode in the ambiguity group is said to be "indicted." When multiple detection tests show failure, the failure mode with the highest number of indictments may be indicated as the most likely fault. In a preferred embodiment, all indicated failure modes are made available for human and/or machine analysis. Failure modes adjudged to be the possible or most likely causes of the active deviation signal or signals may be output through device 26 for human consumption.

Computer 26 may also have active programs executing to ameliorate the perceived failure mode caused by deterioration of engine operation. The computer may provide suggested changes in engine operation. The suggested changes in operation may be output to a human operator and/or fed back to the engine controls automatically.

Figure 4:
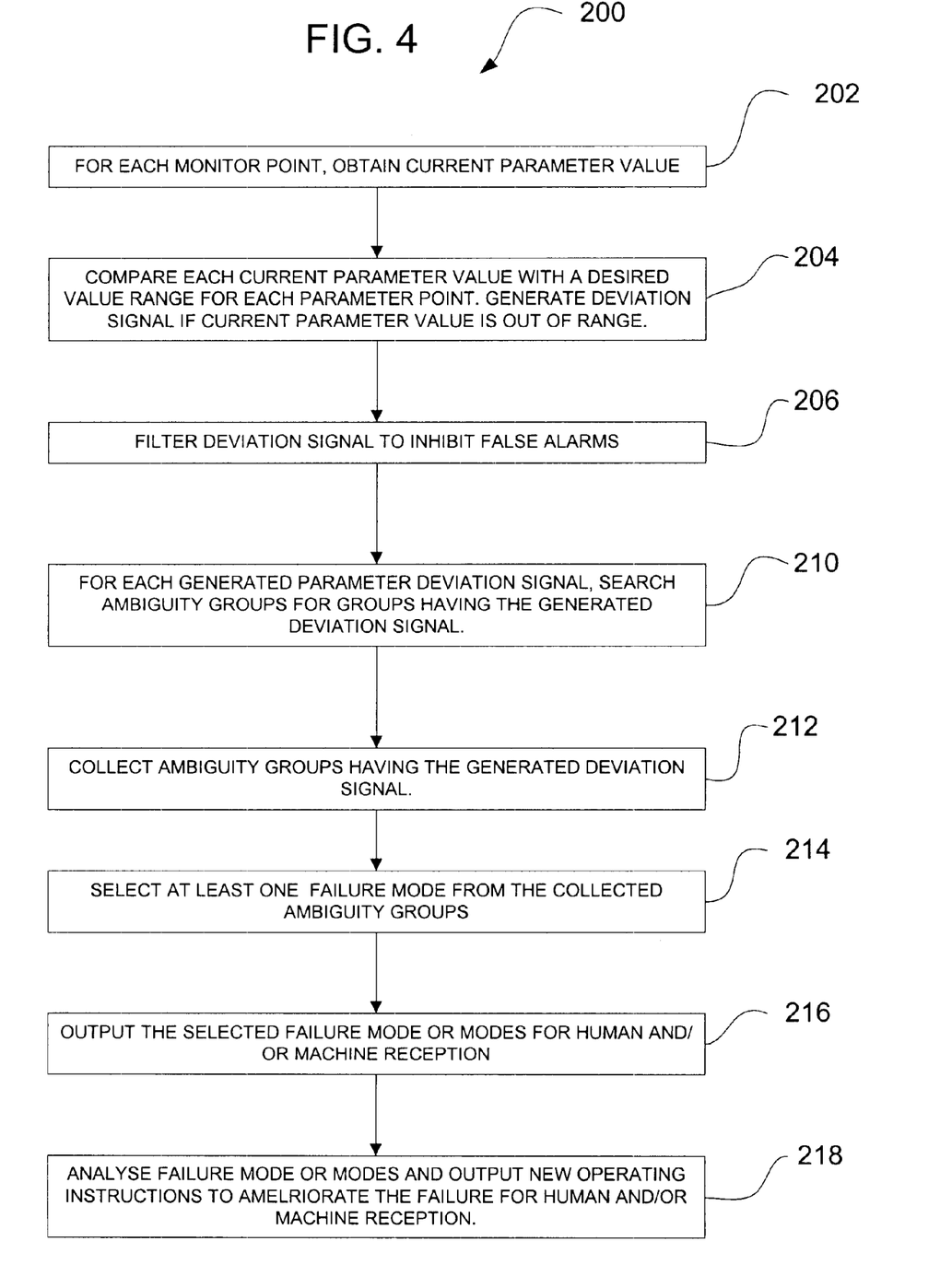
FIG. 4 is a high level flow chart of a method for detecting and isolating engine faults.

FIG. 4 illustrates a method which may be incorporated in a computer program executing within computer 26 or other computer. The computer program may be any suitable compiled or interpreted program, including languages such as Basic, Java, C, C++, ladder logic, or sequential function chart programming. In step 202, each monitor point parameter may be updated to obtain a current value. Monitor point parameters may be updated by directly reading analog or discrete sensors, or by performing calculations on sensor values to obtain derived or inferred monitor point parameter values.

The obtained, current monitor point parameter values may be compared in step 204 by a comparator function against an acceptable range of monitor point values. Some ranges may have no breadth, such as binary or discrete values, for example ON/OFF or HI/NOT HI switch values. Some ranges may have endpoints denoting a range of acceptable values. Other ranges may be acceptable only below a value, at or below a value, above a value, or at or above a value. If the comparator detects an out of range value for a monitor point, a presumptive deviation signal may be generated.

The presumptive deviation signal may be filtered to inhibit false alarms in step 206. Some filtering may include a timer or counter, requiring the presumptive deviation to persist for a period of time or a number of cycles before a deviation signal is generated. The filter may require that a discrete deviation remain unchanged for a period of time or number of cycles, to eliminate momentary false alarms or bounce.

In step 210, for each generated parameter deviation signal, the ambiguity groups may be searched to find those groups having the deviation signal being generated. In step 212, the ambiguity groups having the matching deviation signals may be collected. In some embodiments, the ambiguity groups are presorted by deviation signal, and the searching and collection is made easier.

In step 214, the collected ambiguity groups can be analyzed and one or more failure modes selected for output. In some embodiments, the failure modes are selected based on probability of the ambiguity groups occurring. In other embodiments, the failure modes are selected based on the intersection or Boolean AND of the ambiguity groups having an active deviation signal. The selected deviation signals and failure modes can be output for human and machine consumption is step 216.

In some embodiments, the deviation signals and failure modes are analyzed as in step 218 to determine a suggested mode of operation to ameliorate the problem. In one example, if the engine torque output fails to perform as designed, and the inlet manifold pressure also indicates a failure, but the turbocharger pressure output indicates no failure, then there may be a problem in the air throttle valve, for example, valve sticking or a leak in the manifold. A suggested course of action to ameliorate the problem could be to maintain the engine power through the fuel/air ratio through varying the fuel. On the other hand, if the engine torque output fails, but the inlet manifold pressure indicates no failure, then the resulting ambiguity group should include the fueling system, and a suggested reconfiguration strategy that includes manipulating air or spark would be indicated.

Figure 5:
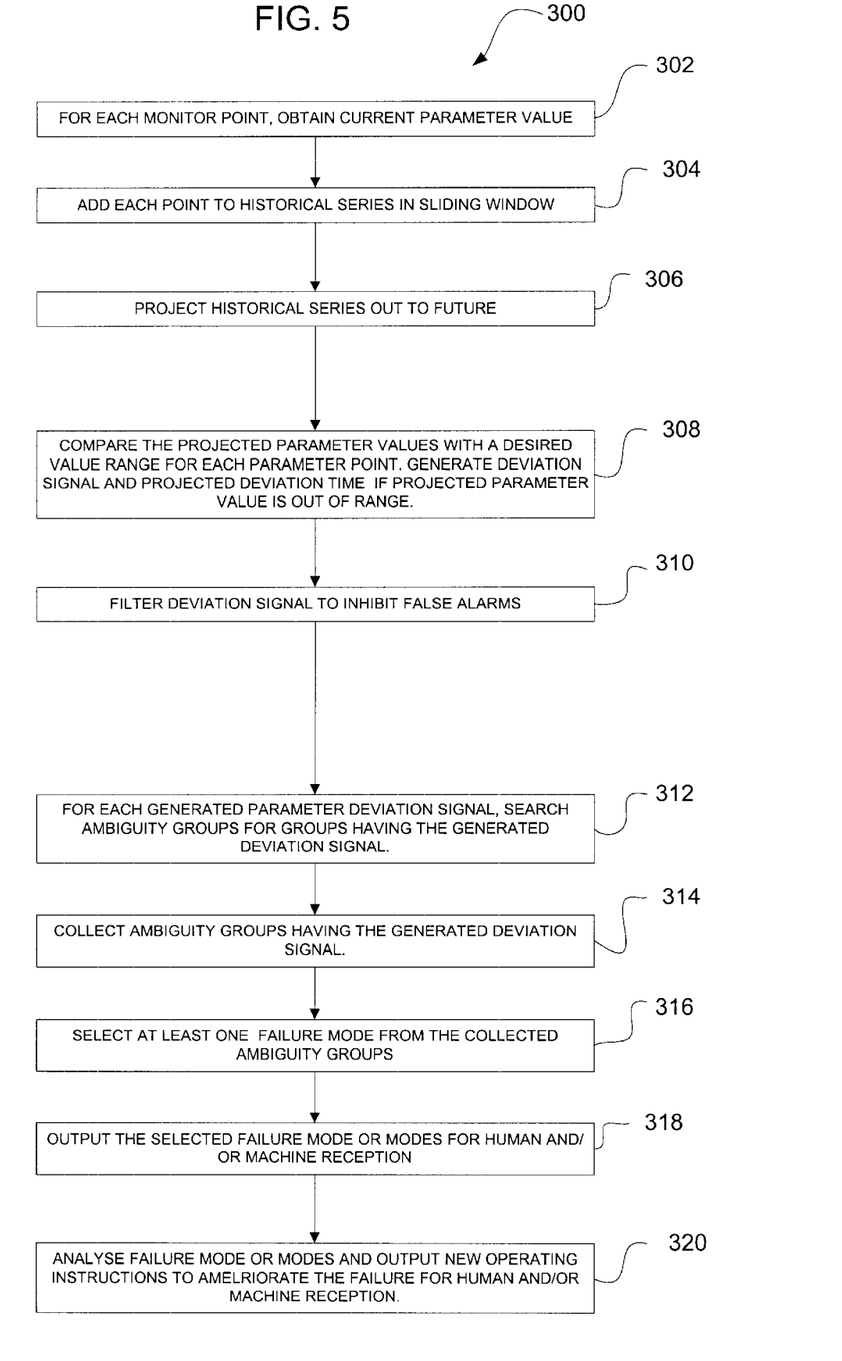
FIG. 5 is a high level flow chart of a method for predicting engine faults.

FIG. 5 illustrates a method 300 for predicting deviations and isolating failure modes early, prior to their actual occurrence. Method 300 may be implemented in an executable computer language, as discussed with respect to method 200 in FIG. 4. Method 300 may be used to generate a predicted deviation to warn early of an impending problem, prior to the time at which the problem actually occurs. Many of the steps of method 300 are similar or identical to those of method 200, previously discussed, and are so noted. Method 300 may be run concurrently with method 200, with may of the steps being the same or combined.

In step 302, values may be obtained for each monitor point, to obtain a parameter value, as discussed with respect to step 202. In step 304, current values may be added to historical values previously collected. In some embodiments, the current values are sampled only at certain time intervals, for example, with data only being stored every 10 cycles, or every 20 seconds. In some embodiments, the current values are filtered, and the filtered values rather than instantaneous values are recorded in the data historian function. In some embodiments, the data is stored in a moving window or circular queue, so that older values are over written by newer values.

In step 306, the set of stored historical values may be extrapolated or projected out into the future. In one embodiment, a weighted least squares form of estimator is used, with the degree of the polynomial being dependent upon the parameter being tested. In some embodiments, the rate of change of the value is taken into account, with more recent values effectively being given more weight. In some embodiments, the noise or deviation of the signal within a time window is analyzed, and a deviation signal set to denote the excessive noise and variability rather than a projected absolute value crossing a limit.

In step 308, the projected parameter value is compared with the acceptable range for that parameter, and an early presumptive deviation alarm may be generated. The comparator may be the same or similar to that discussed with respect to step 204 in method 200. The presumptive early deviation signal preferably has an estimated time of actual deviation associated with the signal. In step 310, the presumptive early alarm may be filtered, using methods similar to those discussed with respect to step 206 in method 200. After filtering, the presumptive early deviation may be termed the early deviation signal, which may be processed by step 312. In step 312, the ambiguity groups may be searched as discussed with respect to step 210 in method 200. The matching ambiguity groups may be collected in step 314, as discussed with respect to step 212 in method 200.

In step 316, at least one failure mode may be selected, using methods the same or similar to the methods discussed with respect to step 214 or method 200. The selected failure mode or modes may be output for human and/or machine consumption in step 318, as discussed with respect to 216 of method 200. Step 320 may be handled somewhat differently than step 218 of method 200. In the case of the early deviation signal, the recommended course of action may be carried out over a longer time frame and be less urgent. The output to the human operator may well be an advisory signal rather than an alarm. In one example, the recommended course of action may be to recommend preventative maintenance earlier than otherwise indicated. In a preferred method, the logic and historical data that led to the projected early deviation signal is presented for human and/or machine consumption.

While the present invention is described with reference to an engine, numerous other applications are contemplated. It is contemplated that the present invention may be applied to any system that is subject to failure so long as adequate sensor data can be collected.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A method for detecting system failure modes, wherein the system has a plurality of monitor points, each point having an actual parameter value, wherein the system has a plurality of failure modes, the method comprising the steps of:

providing a range of desired parameter values for each monitor point;

providing a monitor point comparator function for said monitor points, wherein said monitor point comparator function compares said actual parameter value with said desired parameter value range and generates a parameter deviation signal if said actual parameter value is outside of said desired parameter value range;

providing a plurality of ambiguity groups, said ambiguity groups having at least one failure mode associated with a monitor point deviation signal;

obtaining said actual parameter value;

comparing said actual parameter value with said desired parameter value for each monitor point using said monitor point comparator function and generating a parameter deviation signal if said parameter actual value is outside of said desired parameter value range; and for each generated parameter deviation signal, searching said plurality of ambiguity groups for at least one ambiguity group that includes said generated parameter deviation signal, and identifying at least one failure mode associated with said generated deviation signal.

2. A method according to claim 1 wherein the system is a combustion engine.

3. A method for detecting combustion engine failure modes as in claim 2, further comprising outputting suggested engine operating parameters to ameliorate bad effects of said detected engine faults.

4. A method for detecting combustion engine failure modes as in claim 2, wherein said parameters are selected from the group consisting of: air filter pressure switch; air throttle vale position; alternator inoperative sensor; alternator output voltage; backup control select; battery level; cylinder head temperature (CHD); exhaust gas oxygen (EGO); exhaust gas temperature (EGT); engine crankshaft position; fuel filter pressure switch; fuel flow transducer; fuel injector pulse width command; fuel inlet pressure; fuel pressure; fuel pump outlet pressure; fuel to air ratio; fuel to air ratio trim; ignition and timing command; knock sensor; manifold air pressure (MAP); manifold air temperature (MAT); oil chip detector; oil cooler delta pressure switch; oil filter delta pressure; oil fuel content; oil pressure; oil quantity; oil temperature; revolutions per minute (RPM); sparkplug energy pulse; turbine inlet temperature; turbocharger compressor discharge pressure; turbocharger compressor seal delta pressure; vibration; and wastegate valve position, and combinations thereof.

5. A method for detecting combustion engine failure modes as in claim 2, wherein said identifying step includes selecting a group of ambiguity groups having said parameter deviation signal by searching said ambiguity groups in order of probability of fault mode, taking the intersection of the failure modes in said selected group of ambiguity groups, and outputting said intersecting failure modes.

6. A method for detecting combustion engine failure modes as in claim 2, wherein said providing range of desired parameter values step includes providing a range of continuous values having a high limit and a low limit, and wherein said comparator function generates a deviation signal if said actual value lies outside of said high and low values.

7. A method for detecting combustion engine failure modes as in claim 2, wherein said providing range of desired parameter values includes providing a range of continuous values having only a high limit and said comparator function generates a deviation signal if said actual value is greater than said high value.

8. A method for detecting combustion engine failure modes as in claim 2, wherein said providing range of desired parameter values includes providing a range of continuous values having only a low limit and said comparator function generates a deviation signal if said actual value is less than said low value.

9. A method for detecting combustion engine failure modes as in claim 2, wherein said providing range of desired parameter values includes providing binary values having two states, and said comparator function generates a deviation signal if said actual value is one state rather than another state.

10. A method for detecting combustion engine failure modes as in claim 2, further comprising storing a history of said actual parameter values over time, and saving said stored history prior to said deviation signal generation for later output.

11. A method for detecting combustion engine failure modes as in claim 2, wherein said actual parameters values are inferred values from at least two physical parameter measurements.

12. A method for detecting combustion engine failure modes as in claim 2, wherein said identifying step includes selecting a group of ambiguity groups having said parameter deviation signal, taking the intersection of the failure modes in said selected group of ambiguity groups, and outputting said intersecting failure modes.

13. A method for detecting combustion engine failure modes as in claim 12, wherein said identifying step includes selecting only those failure modes present in all ambiguity modes having said parameter deviation signal.

14. A method for predicting system failure modes, wherein the system has a plurality of monitor points, each point having an actual parameter value, wherein the system has a plurality of failure modes, the method comprising the steps of:

providing a range of desired parameter values for each monitor point;

providing a monitor point comparator function for said monitor points, wherein said monitor point comparator function compares said actual parameter value with said desired parameter value range and generates a parameter deviation signal if said actual parameter value is outside of said desired parameter value range;

providing a plurality of ambiguity groups, said ambiguity groups having at least one failure mode associated with a monitor point deviation signal;

obtaining said actual parameter value history over a plurality of time points;

extrapolating said plurality of time points into the future;

predicting if said extrapolated time points will generate a deviation signal from said comparator;

and, if said deviation signal will be generated, generating a predicted deviation signal, predicted time of deviation and outputting said predicted deviation time; and for each generated predicted parameter deviation signal, searching said plurality of ambiguity groups for at least one ambiguity group that includes said generated predicted parameter deviation signal, and identifying at least one failure mode associated with said predicted generated deviation signal.

15. A method according to claim 14 wherein the system is a combustion engine.

16. A method for predicting combustion engine failures as in claim 15, further comprising outputting suggested engine operating parameters to ameliorate bad effects of said detected engine faults.

17. A method for predicting combustion engine failures as in claim 15, wherein said parameters are selected from the group consisting of: air filter pressure switch; air throttle vale position; alternator inoperative sensor; alternator output voltage; backup control select; battery level; cylinder head temperature (CHD); exhaust gas oxygen (EGO); exhaust gas temperature (EGT); engine crankshaft position; fuel filter pressure switch; fuel flow transducer; fuel injector pulse width command; fuel inlet pressure; fuel pressure; fuel pump outlet pressure; fuel to air ratio; fuel to air ratio trim; ignition and timing command; knock sensor; manifold air pressure (MAP); manifold air temperature (MAT); oil chip detector; oil cooler delta pressure switch; oil filter delta pressure; oil fuel content; oil pressure; oil quantity; oil temperature; revolutions per minute (RPM); sparkplug energy pulse; turbine inlet temperature; turbocharger compressor discharge pressure; turbocharger compressor seal delta pressure; vibration; and wastegate valve position, and combinations thereof.

18. A method for predicting combustion engine failures as in claim 15, wherein said identifying step includes selecting a group of ambiguity groups having said parameter deviation signal by searching said ambiguity groups in order of probability of fault mode, taking the intersection of the failure modes in said selected group of ambiguity groups, and outputting said intersecting failure modes.

19. A method for predicting combustion engine failure modes as in claim 15, wherein said identifying step includes selecting a group of ambiguity groups having said parameter deviation signal, taking the intersection of the failure modes in said selected group of ambiguity groups, and outputting said intersecting failure modes.

20. A method for predicting combustion engine failures as in claim 19, wherein said identifying step includes selecting only those failure modes present in all ambiguity modes having said parameter deviation signal.

21. A computer program for executing a method for detecting system failure modes, wherein the system has a plurality of monitor points, each point having an actual parameter value, wherein the system has a plurality of failure modes, the method comprising the steps of:
providing a range of desired parameter values for each monitor point;
providing a monitor point comparator function for said monitor points, wherein said monitor point comparator function compares said actual parameter value with said desired parameter value range and generates a parameter deviation signal if said actual parameter value is outside of said desired parameter value range;
providing a plurality of ambiguity groups, said ambiguity groups having at least one failure mode associated with a monitor point deviation signal;
obtaining said actual parameter value;
comparing said actual parameter value with said desired parameter value for each monitor point using said monitor point comparator function and generating a parameter deviation signal if said parameter actual value is outside of said desired parameter value range; and
for each generated parameter deviation signal, searching said plurality of ambiguity groups for at least one ambiguity group that includes said generated parameter deviation signal, and identifying at least one failure mode associated with said generated deviation signal.

22. A method according to claim 21 wherein the system is a combustion engine.

23. A computer program for executing a method for predicting system failure modes, wherein the system has a plurality of monitor points, each point having an actual parameter value, wherein the system has a plurality of failure modes, the method comprising the steps of:
providing a range of desired parameter values for each monitor point;
providing a monitor point comparator function for said monitor points, wherein said monitor point comparator function compares said actual parameter value with said desired parameter value range and generates a parameter deviation signal if said actual parameter value is outside of said desired parameter value range;
providing a plurality of ambiguity groups, said ambiguity groups having at least one failure mode associated with a monitor point deviation signal;
obtaining said actual parameter value history over a plurality of time points;
extrapolating said plurality of time points into the future;
predicting if said extrapolated time points will generate a deviation signal from said comparator;
and, if said deviation signal will be generated, generating a predicted deviation signal, predicted time of deviation and outputting said predicted deviation time; and
for each generated predicted parameter deviation signal, searching said plurality of ambiguity groups for at least one ambiguity group that includes said generated predicted parameter deviation signal, and identifying at least one failure mode associated with said predicted generated deviation signal.

24. A method according to claim 23 wherein the system is a combustion engine.

25. A computer monitoring system for coupling to a system, said computer monitoring system running a program for executing a method for detecting system failure modes, wherein the system has a plurality of monitor points, each point having an actual parameter value, wherein the system has a plurality of failure modes, wherein the computer monitoring system is coupled to said monitor points and able to read said monitor points, the method comprising the steps of:
providing a range of desired parameter values for each monitor point;
providing a monitor point comparator function for said monitor points, wherein said monitor point comparator function compares said actual parameter value with said desired parameter value range and generates a parameter deviation signal if said actual parameter value is outside of said desired parameter value range;
providing a plurality of ambiguity groups, said ambiguity groups having at least one failure mode associated with a monitor point deviation signal;
obtaining said actual parameter value;
comparing said actual parameter value with said desired parameter value for each monitor point using said monitor point comparator function and generating a parameter deviation signal if said parameter actual value is outside of said desired parameter value range; and
for each generated parameter deviation signal, searching said plurality of ambiguity groups for at least one ambiguity group that includes said generated parameter deviation signal, and identifying at least one failure mode associated with said generated deviation signal.

26. A method according to claim 25 wherein the system is a combustion engine.

27. A computer monitoring system for coupling to a system, said computer monitoring system running a program for executing a method for predicting system failures, wherein the system has a plurality of monitor points, each point having an actual parameter value, wherein the system has a plurality of failure modes, wherein the computer monitoring system is coupled to said monitor points and able to read said monitor points, the method comprising the steps of:

providing a range of desired parameter values for each monitor point;

providing a monitor point comparator function for said monitor points, wherein said monitor point comparator function compares said actual parameter value with said desired parameter value range and generates a parameter deviation signal if said actual parameter value is outside of said desired parameter value range;

providing a plurality of ambiguity groups, said ambiguity groups having at least one failure mode associated with a monitor point deviation signal;

obtaining said actual parameter value history over a plurality of time points;

extrapolating said plurality of time points into the future;

predicting if said extrapolated time points will generate a deviation signal from said comparator;

and, if said deviation signal will be generated, generating a predicted deviation signal, predicted time of deviation and outputting said predicted deviation time; and for each generated predicted parameter deviation signal, searching said plurality of ambiguity groups for at least one ambiguity group that includes said generated predicted parameter deviation signal, and identifying at least one failure mode associated with said predicted generated deviation signal.

28. A method according to claim 27 wherein the system is a combustion engine.

* * * * *

UNITED STATES PATENT AND TRADEMARK OFFICE
CERTIFICATE OF CORRECTION

PATENT NO. : 6,456,928 B1
DATED : September 24, 2002
INVENTOR(S) : Daniel P. Johnson It is certified that error appears in the above-identified patent and that said Letters Patent is hereby corrected as shown below:

<u>Title page,</u>
Item [74], insert: -- *Attorney, Agent or Firm*: Kris T. Fredrick --

Signed and Sealed this

Eighteenth Day of February, 2003

JAMES E. ROGAN
*Director of the United States Patent and Trademark Office*